(12) United States Patent
Chiang et al.

(10) Patent No.: US 10,663,746 B2
(45) Date of Patent: May 26, 2020

(54) COLLIMATOR, OPTICAL DEVICE AND METHOD OF MANUFACTURING THE SAME

(71) Applicant: Advanced Semiconductor Engineering, Inc., Kaohsiung (TW)

(72) Inventors: Yuan-Feng Chiang, Kaohsiung (TW); Tsung-Tang Tsai, Kaohsiung (TW); Min Lung Huang, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 158 days.

(21) Appl. No.: 15/347,675

(22) Filed: Nov. 9, 2016

(65) Prior Publication Data

US 2018/0129062 A1    May 10, 2018

(51) Int. Cl.
    *G02B 27/30*  (2006.01)
    *G02B 5/00*   (2006.01)
    *G02B 19/00*  (2006.01)

(52) U.S. Cl.
    CPC ............ *G02B 27/30* (2013.01); *G02B 5/005* (2013.01); *G02B 19/0066* (2013.01)

(58) Field of Classification Search
    CPC ..... G02B 27/30; G02B 5/005; G02B 19/0066
    USPC .......................................................... 359/641
    See application file for complete search history.

(56) References Cited

U.S. PATENT DOCUMENTS

| | | |
|---|---|---|
| 5,773,829 A | 6/1998 | Iwanczyk et al. |
| 2012/0292524 A1* | 11/2012 | Wieland ................. B82Y 10/00 250/398 |
| 2014/0091229 A1* | 4/2014 | Nomura .................. H01J 37/12 250/396 R |
| 2016/0045767 A1 | 2/2016 | Bender et al. |

* cited by examiner

*Primary Examiner* — Joseph P Martinez
*Assistant Examiner* — Vipin Pattel
(74) *Attorney, Agent, or Firm* — Foley & Lardner LLP

(57) ABSTRACT

According to various embodiments, a collimator includes a substrate defining a plurality of channels through the substrate. The substrate includes a first surface and a second surface opposite the first surface. Each of the channels includes a first aperture exposed from the first surface, a second aperture between the first surface and the second surface, and a third aperture exposed from the second surface. The first aperture and the third aperture are larger than the second aperture.

8 Claims, 11 Drawing Sheets

COLLIMATOR, OPTICAL DEVICE AND METHOD OF MANUFACTURING THE SAME

BACKGROUND

1. Technical Field

The present disclosure relates to a collimator, an optical device and a method of manufacturing the same, and more particularly, to a collimator with a high scattering level and a method of manufacturing the same.

2. Description of Related Art

A collimator is one of the components in many optical applications such as in the use of X-ray machines and optical communication systems. The collimator is a component that narrows a beam of particles or waves, such that the direction of beam is more aligned in a specific direction.

SUMMARY

In one or more embodiments, a collimator includes a substrate defining a plurality of channels through the substrate. The substrate includes a first surface and a second surface opposite the first surface. Each of the channels includes a first aperture exposed from the first surface, a second aperture between the first surface and the second surface, and a third aperture exposed from the second surface. The first aperture and the third aperture are larger than the second aperture.

In one or more embodiments, an optical device includes a collimator and an optoelectronic element disposed over the collimator. The collimator includes a substrate defining a plurality of channels through the substrate. The substrate includes a first surface and a second surface opposite the first surface. Each of the channels includes a first aperture exposed from the first surface, a second aperture between the first surface and the second surface, and a third aperture exposed from the second surface. The first aperture and the third aperture are larger than the second aperture.

In one or more embodiments, a method of manufacturing a collimator includes providing a substrate including a first surface and a second surface opposite the first surface, forming a first recess including a first tapered inner surface from the first surface of the substrate, and forming a second recess from the second surface of the substrate. The second recess is in communication with the first recess, forming a channel through the substrate.

BRIEF DESCRIPTION OF THE DRAWINGS

Aspects of the present disclosure are best understood from the following detailed description when read with the accompanying figures. It is noted that various structures may not be drawn to scale, and the dimensions of the various structures may be arbitrarily increased or reduced for clarity of discussion.

DETAILED DESCRIPTION

Figure 1:
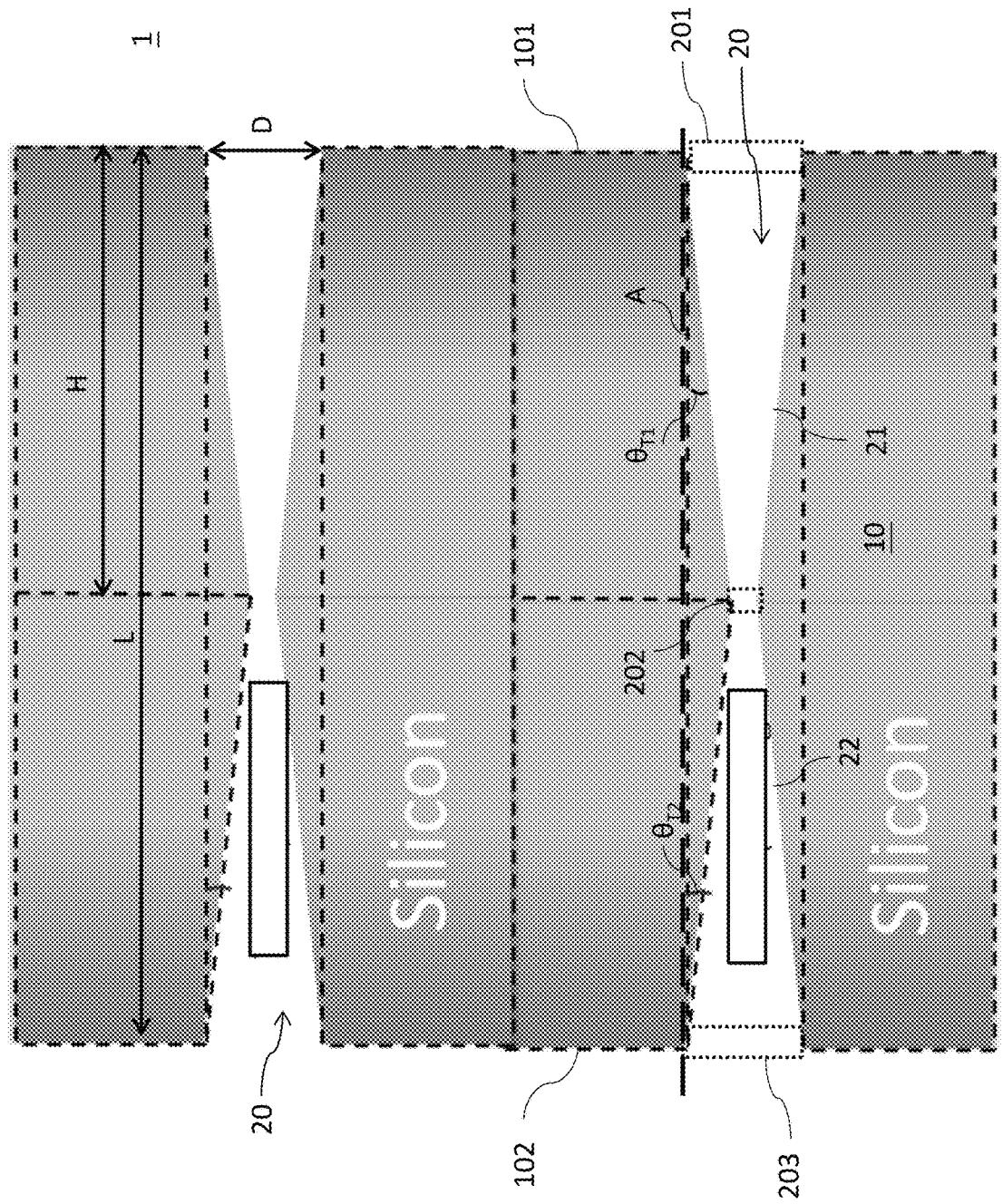
FIG. 1 is a schematic illustration of an example of a collimator in accordance with some embodiments of the present disclosure.

Typically, a collimator includes through holes (e.g., channels) with high aspect ratios to provide suitable collimation. The collimator includes through holes with vertical inner surfaces, which may cause problems of poor shape control during fabrication, high cost, limited application and misalignment. In one approach, the high aspect ratio through holes with vertical inner surfaces are formed by an etching technique which includes a thicker photoresist as an etch mask. However, the profile of the through hole may be difficult to control as the aspect ratio gets higher. In another approach, the through holes are formed by laser drilling. However, the aspect ratio of the through hole formed by laser drilling may be relatively low and the surface roughness of the through holes may be high, which may deteriorate an optical effect.

The present disclosure provides many different embodiments, or examples, for implementing different features of the provided subject matter. Specific examples of components and arrangements are described below by way of example, and are not to be construed as limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of clarity and does not in itself dictate a relationship between the various embodiments and/or configurations discussed.

Spatial descriptions, such as "above," "below," "up," "left," "right," "down," "top," "bottom," "vertical," "horizontal," "side," "higher," "lower," "upper," "over," "under," "inner," "outer," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from such arrangements.

The following description is directed to a collimator. In some embodiments, the collimator includes a substrate, and several channels through the substrate. The channel includes a tapered inner surface and a minimum aperture (e.g., a smallest aperture within the channel) distal to (or spaced from or interposed between) two openings of the channel. The channel further includes an outwardly inclined inner surface, which makes it possible to increase an aspect ratio without being restricted by any process limitation, thereby improving the collimation ability of the collimator.

The following description is also directed to an optical device. In some embodiments, the optical device includes the aforementioned collimator and an optoelectronic element disposed over the collimator. In one or more embodiments, the term "optoelectronic element" refers to an electromagnetic radiation-responsive element to encompass an element sensitive to various wavelengths of visible light and/or other forms of electromagnetic radiation, including, but not limited to, a charged coupled device (CCD), a complementary metal-oxide semiconductor (CMOS) image sensor, and a photodiode. In one or more embodiments, the term "optoelectronic element" refers to an electromagnetic radiation-emitting element to encompass an element able to emit various wavelengths of visible light and/or other forms of electromagnetic radiation, including, but not limited to, a light-emitting diode (LED) and an organic light-emitting diode (OLED).

The following description is also directed to a method of manufacturing the aforementioned collimator, as discussed below.

FIG. 1 is a schematic illustration of an example of a collimator 1 in accordance with some embodiments of the present disclosure. Referring to FIG. 1, in some embodiments, the collimator 1 includes a substrate 10, and a plurality of channels 20. The substrate 10 includes a first surface 101 and a second surface 102 opposite to the first surface 101. In one or more embodiments, the substrate 10 is, but not limited to, a semiconductor substrate such as a silicon substrate. The channels 20 penetrate through the substrate 10. Each of the channels 20 includes a first aperture 201, a second aperture 202 and a third aperture 203. The first aperture 201 is exposed from, or adjacent to, the first surface 101, the second aperture 202 is between the first surface 101 and the second surface 102, and the third aperture 203 is exposed from, or adjacent to, the second surface 102. The first aperture 201 and the third aperture 203 are larger than the second aperture 202. In one or more embodiments, the second aperture 202 is the smallest or most narrow aperture of the channel 20 (e.g., the second aperture 202 corresponds to the narrowest portion of the channel 20). In one or more embodiments, the dimension variation between the first aperture 201 and the second aperture 202, and between the second aperture 202 and the third aperture 203, is substantially continuous. In other words, an elevation of the surface within the channel 20 may increase linearly (e.g., from the first aperture 201 to the second aperture 202) and decrease linearly (e.g., from the second aperture 202 to the third aperture 203). By way of example, the channel 20 may include an hourglass shape or an X-shape when viewed in a cross-section.

In one or more embodiments, each of the channels 20 includes a first tapered inner surface 21 between the first aperture 201 and the second aperture 202, and the first tapered inner surface 21 includes a first tapered angle $\theta_{T1}$. The first tapered angle $\theta_{T1}$ is an included angle between the first tapered inner surface 21 and an imaginary plane A substantially perpendicular to the first surface 101 or the second surface 102 of the substrate 10. In one or more embodiments, a value of the first tapered angle $\theta_{T1}$ is larger than about 0° and smaller than or equal to about 45°. By way of example, the first tapered angle $\theta_{T1}$ includes a range from about 1° to about 30°, from about 1° to about 20°, from about 1° to about 10°, from about 1° to about 5°, from about 1° to about 4°, from about 1° to about 3°, or from about 1° to about 2°.

In one or more embodiments, each of the channels 20 further includes a second tapered inner surface 22 between the second aperture 202 and the third aperture 203, and the second tapered inner surface 22 includes a second tapered angle $\theta_{T2}$. The second tapered angle $\theta_{T2}$ is an included angle between the second tapered inner surface 22 and the imaginary plane A substantially perpendicular to the first surface 101 or the second surface 102 of the substrate 10. In one or more embodiments, the first tapered inner surface 21 and the second tapered inner surface 22 are connected to each other, and the second aperture 202 is located at an interface between the first tapered inner surface 21 and the second tapered inner surface 22.

In one or more embodiments, a distance H between the first aperture 201 and the second aperture 202 is substantially half a depth L of the channel 20, and a value of the first tapered angle $\theta_{T1}$ is substantially equal to a value of the second tapered angle $\theta_{T2}$. In one or more embodiments, a surface roughness of the first tapered inner surface 21 and/or a surface roughness of the second tapered inner surface 22 is, but not limited to, less than about 20 nanometers (nm), in term of, for example, a root mean square value of surface variations.

Figure 2:
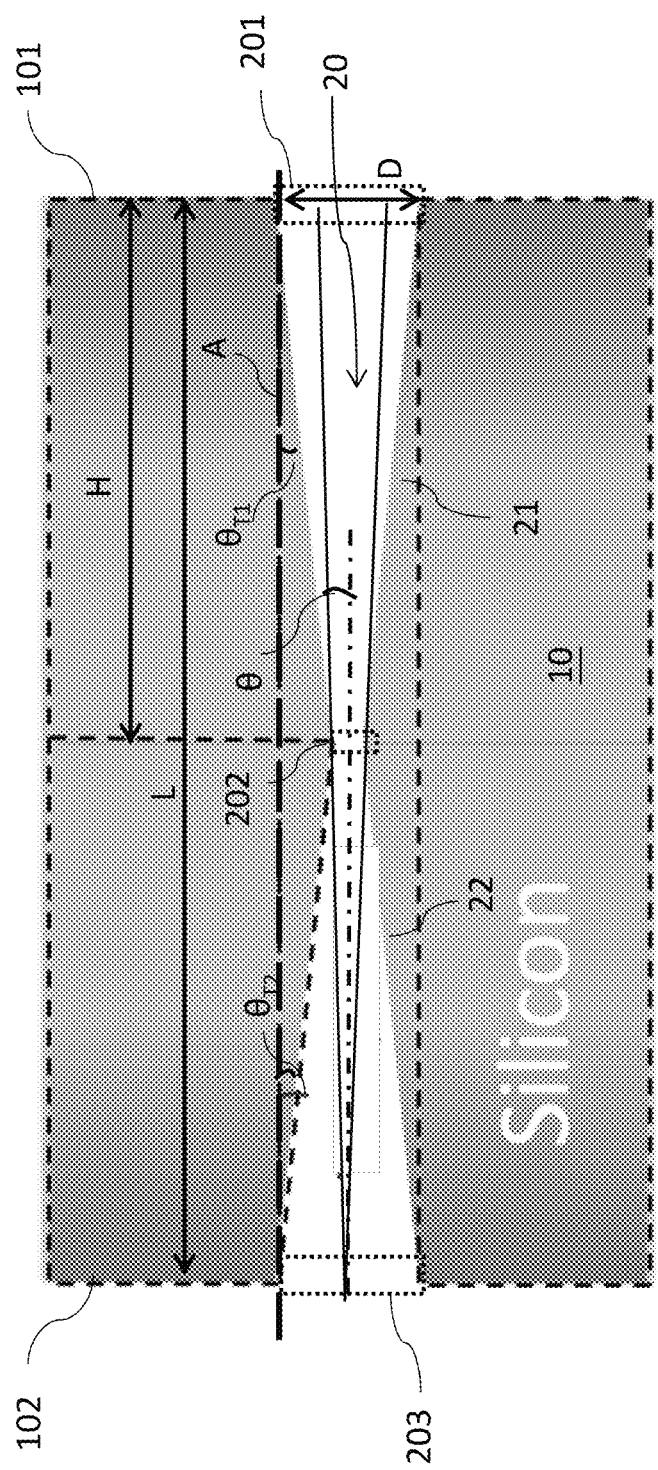
FIG. 2 illustrates a light path of the collimator shown in FIG. 1 in accordance with some embodiments of the present disclosure.

FIG. 2 illustrates a light path of the collimator 1 in accordance with some embodiments of the present disclosure. It is noted that the collimator 1 is designed to provide a scattering level N having a given value based on a specification of the collimator 1. The scattering level N is a fraction of photons that are introduced into the collimator 1 that can pass through the collimator 1. By way of example, if the scattering level N is 10,000, 1 photon out of 10,000 photons is able to exit from the collimator 1. Based on optical theorem, the first tapered angle $\theta_{T1}$ of the collimator 1 may be derived from or determined by the following equation (1):

$$\tan\theta_{T1} = \frac{N}{(N-2)l}\left[\frac{D(N-2)}{2N} - L\sin\theta\right] \quad (1)$$

where $\theta_{T1}$ is the first tapered angle;

N is a scattering level having a given value;

L is the depth of the channel 20;

D is a diameter (or another measure of size) of the first aperture 201; and $\theta$ is an acceptance angle of a light beam entering the channel 20.

Accordingly, the desired scattering level N can be obtained by selection of the channel 20 including the first tapered angle $\theta_{T1}$, the depth L of the channel 20, the diameter D of the first aperture 201, and the acceptance angle $\theta$ of a light beam entering the channel 20.

Table 1 lists scattering levels of the collimator 1 with different dimensions in an optical simulation. Some dimensions are listed in micrometers (μm).

TABLE 1

| | Sample | | | | | | | |
|---|---|---|---|---|---|---|---|---|
| | 1 | 2 | 3 | 4 | 5 | 6 | 7 | 8 |
| D (μm) | 10 | | | | 15 | | | |
| L (μm) | 250 | 200 | 150 | 100 | 250 | 200 | 150 | 100 |
| Aperture ratio (AR) | 25 | 20 | 15 | 10 | 17 | 13 | 10 | 7 |
| Units per hour (UPH) | 0.36 | 0.48 | 0.72 | 1.03 | 0.51 | 0.65 | 1.03 | 1.44 |
| N ($\theta_{T1} = 0°$) | 2503.0 | 1603.0 | 903.0 | 403.0 | 1110.1 | 710.1 | 399.0 | 176.8 |
| N ($\theta_{T1} = 1°$) | 1872.8 | 3779.5 | 1654.7 | 590.1 | 1262.2 | 947.1 | 737.1 | 590.1 |
| N ($\theta_{T1} = 2°$) | 155050.3 | 17594.4 | 3972.0 | 947.4 | 24810.6 | 4400.9 | 1767.0 | 947.0 |

As shown in Table 1, in some embodiments, a higher scattering level N, such as where N is greater than about 2500, can be obtained by forming the first tapered inner surface 21, namely, by increasing the first tapered angle $\theta_{T1}$, while the diameter D of the first aperture 201 and the depth L of the channel 20 are maintained. Specifically, a higher scattering level N can be obtained even when the channel 20 includes a relatively low AR, which may be easier to fabricate. As can be seen in Table 1, as the AR decreases, UPH increases for the channel 20 with lower AR, which can be formed more efficiently.

Figure 3:
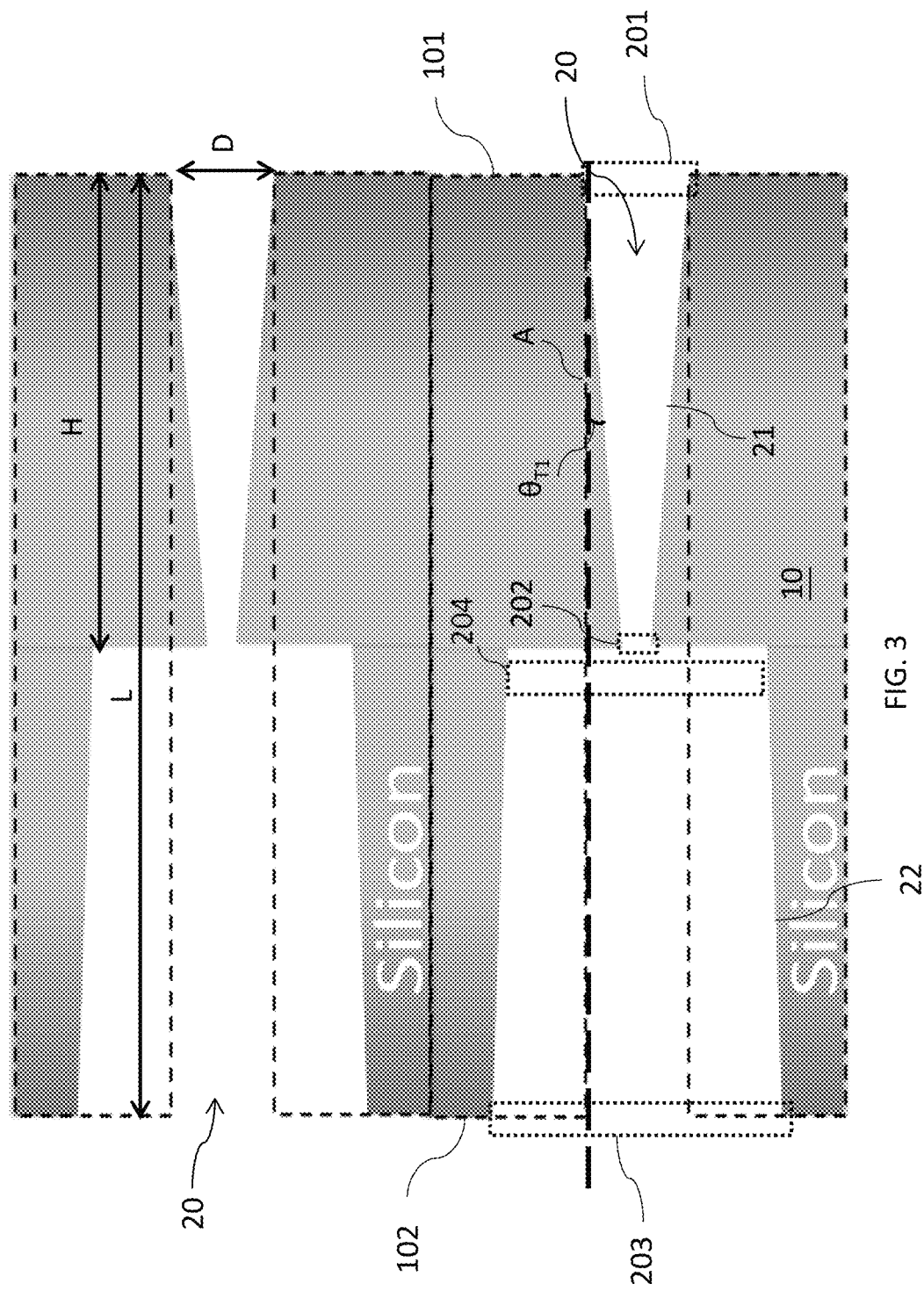
FIG. 3 is a schematic illustration of an example of a collimator in accordance with some embodiments of the present disclosure.

FIG. 3 is a schematic illustration of an example of a collimator 2 in accordance with some embodiments of the present disclosure. The collimator 2 is similar to the collimator 1 illustrated in FIG. 1, and same-numbered features may not be discussed again. Referring to FIG. 3, in some embodiments, the channel 20 further includes a fourth aperture 204 adjacent to the second aperture 202, and the fourth aperture 204 is larger than the second aperture 202 and smaller than the third aperture 203. The second tapered inner surface 22 is disposed between the third aperture 203 and the fourth aperture 204. In one or more embodiments, the second tapered inner surface 22 is disconnected from the first tapered inner surface 21. In other words, the second tapered inner surface 22 is separated from the first tapered inner surface 21 by a wall formed at the second aperture 202. In one or more embodiments, the distance H between the first aperture 201 and the second aperture 202 may not be half the depth L of the channel 20 (e.g., the distance H may be less than half of the depth L). Since the fourth aperture 204 is larger than the second aperture 202, and the second tapered inner surface 22 is disconnected or separated from the first tapered inner surface 21, less alignment accuracy between the second aperture 202 and the fourth aperture 204 may be used. Furthermore, process time and manufacturing costs can be reduced.

Figure 4:
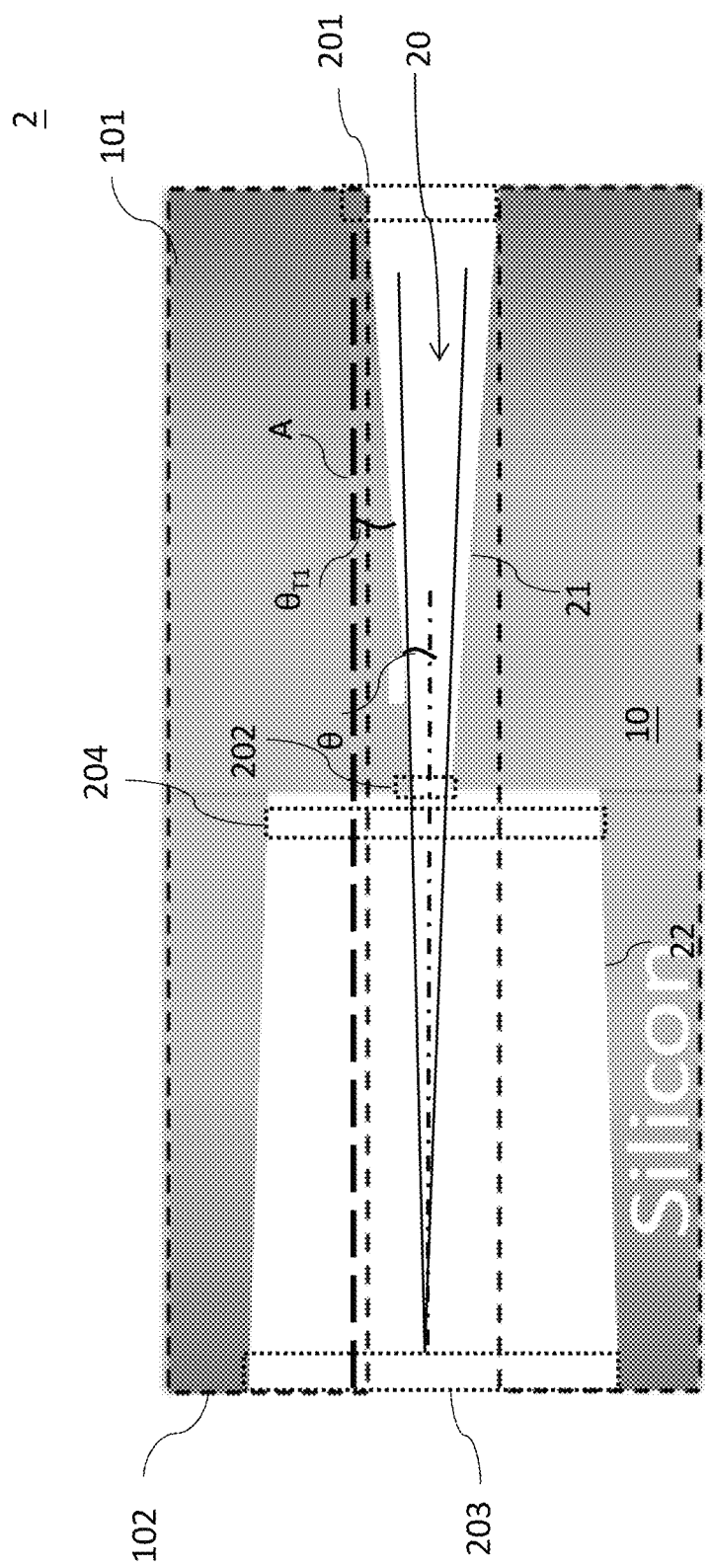
FIG. 4 illustrates a light path of the collimator shown in FIG. 3 in accordance with some embodiments of the present disclosure.

FIG. 4 illustrates a light path of the collimator 2 in accordance with some embodiments of the present disclosure. Based on optical theorem, the first tapered angle $\theta_{T1}$ of the collimator 2 may be derived from or determined by the following equation (2):

$$\tan\theta_{T1} = \frac{N}{2(N-2)H}\left[\frac{D(N-2)}{2N} - 2H\sin\theta\right] \quad (2)$$

where $\theta_{T1}$ is the first tapered angle;

N is a scattering level having a given value;

H is the distance between the first aperture 201 and the second aperture 202;

D is the diameter (or another measure of size) of the first aperture 201; and $\theta$ is an acceptance angle of a light beam entering the channel 20.

Table 2 lists scattering levels of the collimator 2 with different dimensions in an optical simulation.

TABLE 2

| | Sample | | | | | | | |
|---|---|---|---|---|---|---|---|---|
| | 1 | 2 | 3 | 4 | 5 | 6 | 7 | 8 |
| D (μm) | 10 | | | | 15 | | | |
| H (μm) | 125 | 100 | 75 | 50 | 125 | 100 | 75 | 50 |
| UPH | 0.36 | 0.48 | 0.72 | 1.03 | 0.51 | 0.65 | 1.03 | 1.44 |
| AR | 25 | 20 | 15 | 10 | 17 | 13 | 10 | 7 |
| N ($\theta_{T1} = 0°$) | 2503.0 | 1603.0 | 903.0 | 403.0 | 1110.1 | 710.1 | 399.0 | 176.8 |
| N ($\theta_{T1} = 1°$) | 1872.8 | 3779.5 | 1654.7 | 590.1 | 1262.2 | 947.1 | 737.1 | 590.1 |
| N ($\theta_{T1} = 2°$) | 155050.3 | 17594.4 | 3972.0 | 947.4 | 24810.6 | 4400.9 | 1767.0 | 947.0 |

As shown in Table 2, in some embodiments, a higher scattering level N, such as where N is greater than about 2500, can be obtained by forming the first tapered inner surface 21, namely, by increasing the first tapered angle $\theta_{T1}$, while the diameter D of the first aperture 201 and the distance H between the first aperture 201 and the second aperture 202 are maintained. Specifically, a higher scattering level N can be obtained even when the channel 20 includes a relatively low AR, which may be easier to fabricate. As can be seen in Table 2, as the AR decreases, UPH increases for the channel 20 with lower AR, which can be formed more efficiently.

Figure 5:
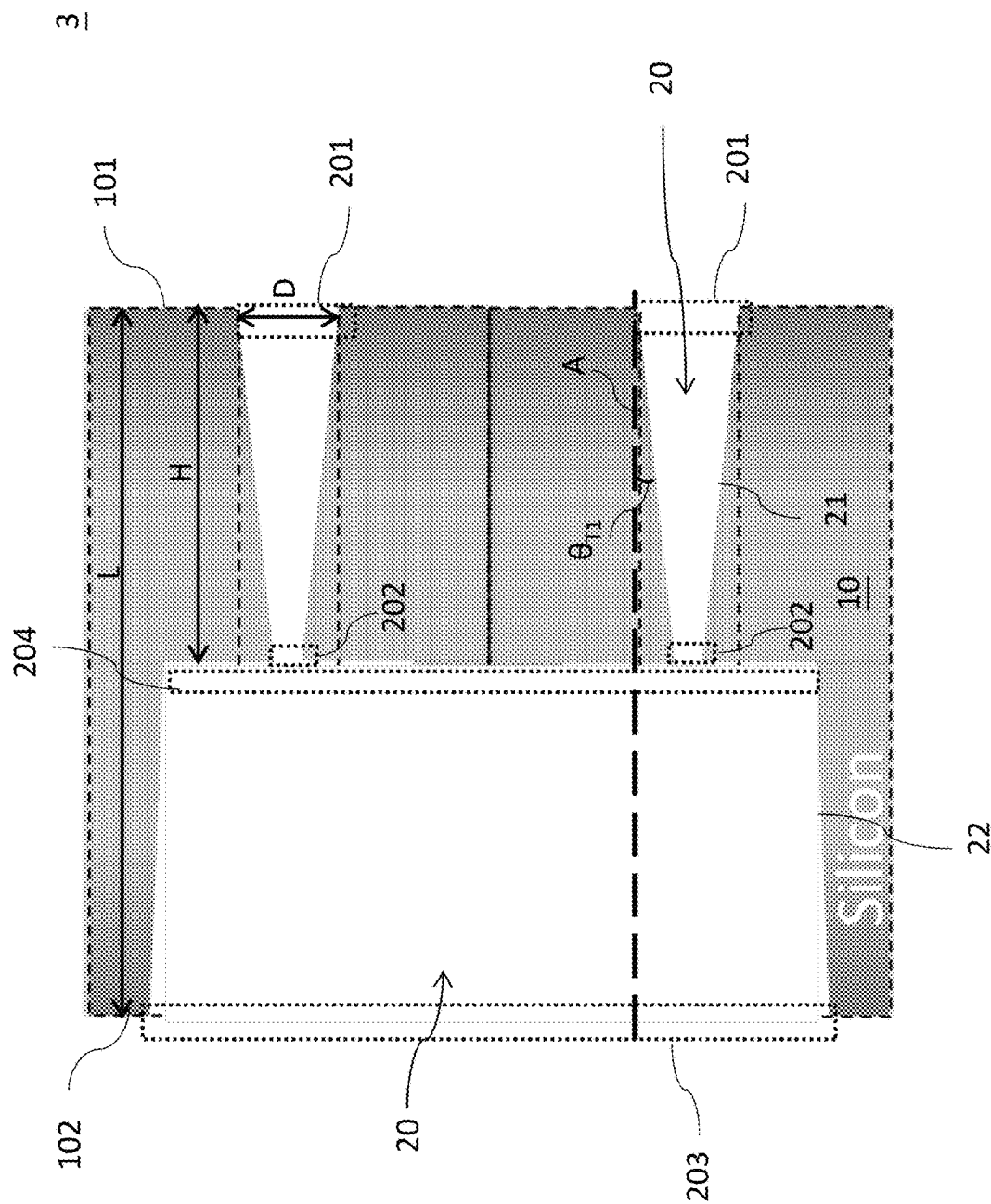
FIG. 5 is a schematic illustration of an example of a collimator in accordance with some embodiments of the present disclosure.

FIG. 5 is a schematic illustration of an example of a collimator 3 in accordance with some embodiments of the present disclosure. The collimator 3 is similar to the collimator 2 illustrated in FIG. 3, and same-numbered features may not be discussed again. Referring to FIG. 5, a plurality of third apertures 203 of a plurality of the channels 20 are in communication or connected with one another (e.g., the plurality of third apertures 203 corresponding to adjacent and different channels 20 are in communication or connected with each other, thereby forming one large, continuous third aperture 203). By way of example, the third apertures 203 of two adjacent channels 20 are connected to each other.

Figure 6:
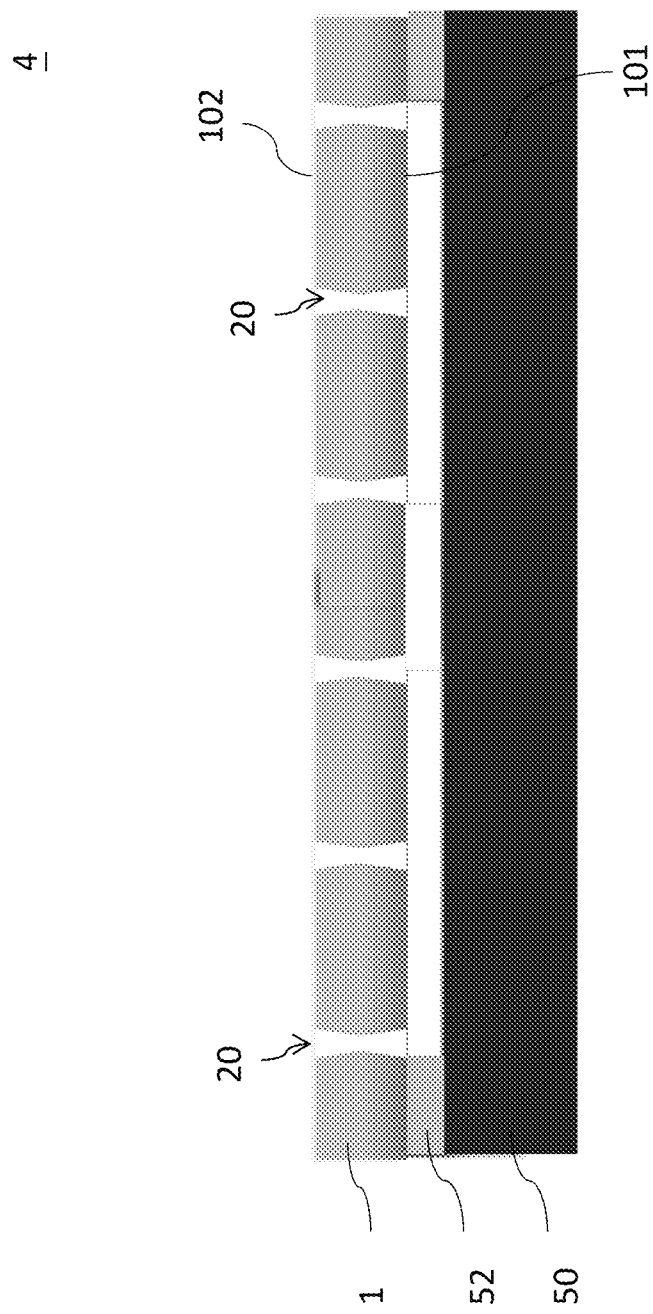
FIG. 6 is a schematic illustration of an example of an optical device in accordance with some embodiments of the present disclosure.

FIG. 6 is a schematic illustration of an example of an optical device 4 in accordance with some embodiments of the present disclosure. Referring to FIG. 6, the optical device 4 includes the collimator 1 and an optoelectronic element 50, which may be an electromagnetic radiation-responsive element. In some embodiments, the collimator 1 of FIG. 1 is selected as an example, and details of the collimator 1 may not be discussed below. In other embodiments, the collimator 2 of FIG. 3 and/or the collimator 3 of FIG. 5 may be selected. The optoelectronic element 50 is disposed over the collimator 1. In one or more embodiments, the collimator 1 is coupled to the optoelectronic element 50 with an adhesive layer 52. In one or more embodiments, the optoelectronic element 50 includes a plurality of electromagnetic radiation-responsive units corresponding to and aligned with one or more of the channels 20. The electromagnetic radiation-responsive units are configured to sense the light collimated by the collimator 1. In one or more embodiments, the optoelectronic element 50 includes a plurality of electromagnetic radiation-emitting units corresponding to and aligned with one or more of the channels 20. The collimator 1 may be configured to collimate the light emitted from the electromagnetic radiation-emitting units.

The optical device 4 may be used in various applications such as optical sensing applications, optical communications, electronics and microelectromechanical systems (MEMS). By way of example, the optical device 4 may be applied in 3D scanners, smartphones, tablet computers, laptop computers, car electronics, virtual reality (VR) products, or internet of things (IOT).

FIG. 7A, FIG. 7B, FIG. 7C, FIG. 7D and FIG. 7E illustrate an example of a method of manufacturing a collimator according to some embodiments of the present disclosure.

Figure 7A:
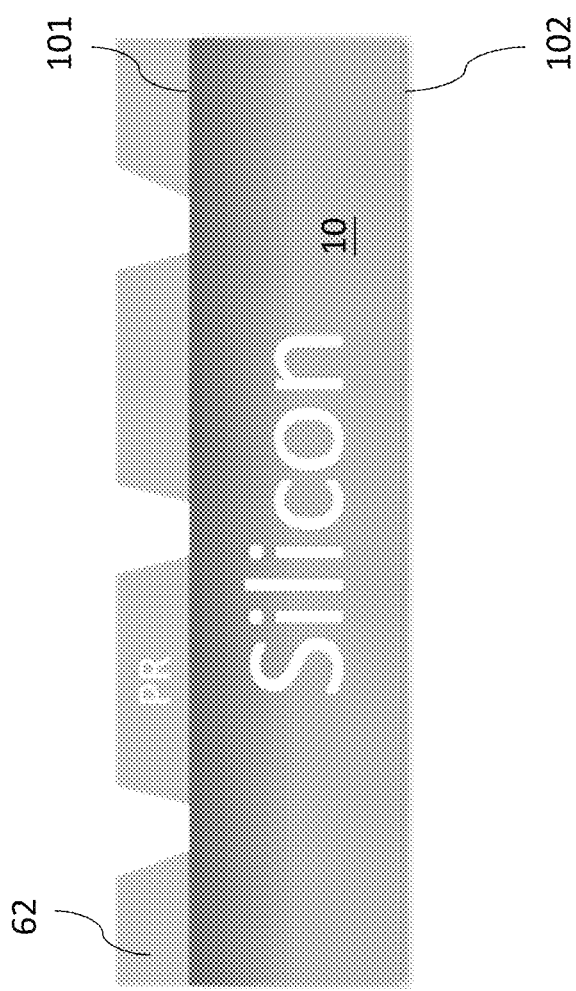
FIG. 7A, FIG. 7B, FIG. 7C, FIG. 7D and FIG. 7E illustrate an example of a method of manufacturing a collimator according to some embodiments of the present disclosure.

Referring to FIG. 7A, the substrate 10 is provided. The substrate 10 includes a first surface 101 and a second surface 102 opposite the first surface 101. A first mask layer (e.g. a photoresist (PR) layer) 62 is formed over the first surface 101 of the substrate 10. The first mask layer 62 exposes a portion of the first surface 101.

Figure 7B:
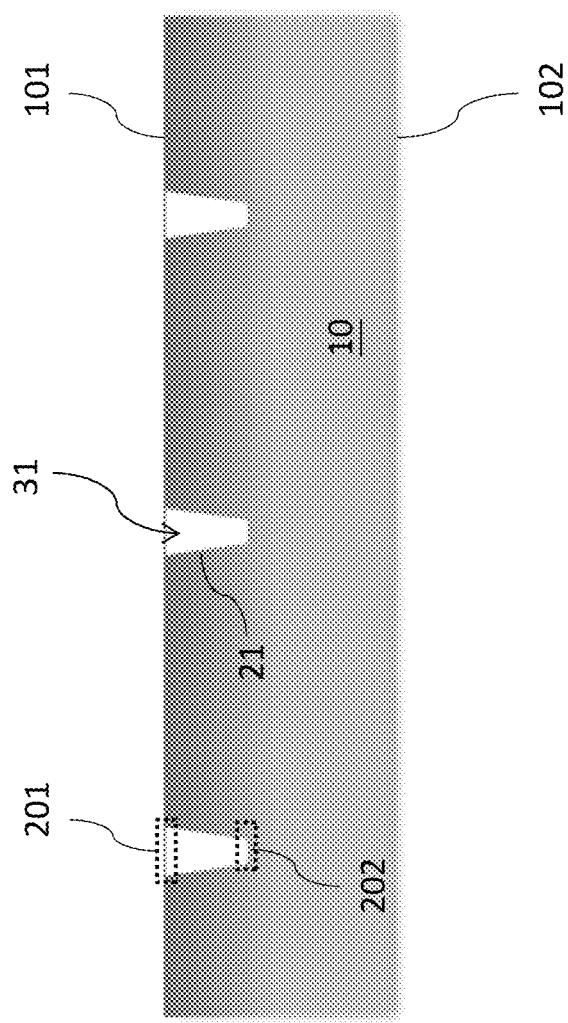

Referring to FIG. 7B, a plurality of first recesses 31 are formed from the first surface 101 of the substrate 10. Each of the first recesses 31 includes the first tapered inner surface 21. The first recess 31 includes the first aperture 201 exposed from the first surface 101, and the second aperture 202 distal to or spaced from the first surface 101. The second aperture 202 is smaller than the first aperture 201. In one or more embodiments, the first recesses 31 are formed by etching, such as by anisotropic etching, such that the first recess 31 includes the first tapered inner surface 21 with lower surface roughness. By way of example, the anisotropic etching includes, but is not limited to, dry etching. In one or more embodiments, the surface roughness of the first tapered inner surface 21 is, but not limited to, less than about 20 nm. Subsequently, the first mask layer 62 is removed from the first surface 101 of the substrate 10.

Figure 7C:
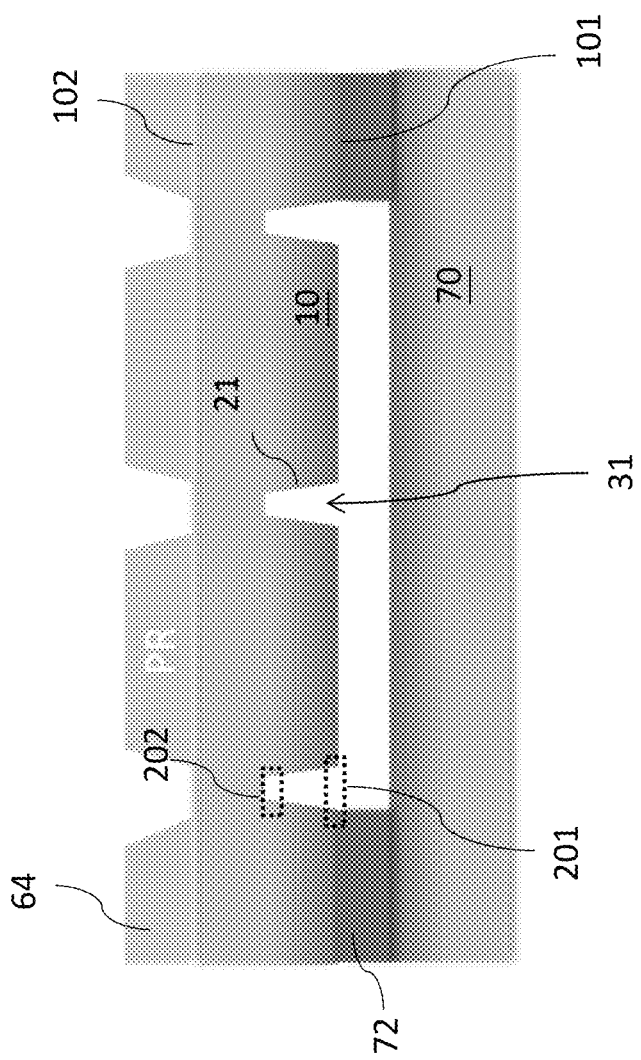

Referring to FIG. 7C, the first surface 101 of the substrate 10 is bonded to a carrier 70 by, for example, an adhesive layer 72. In one or more embodiments, the substrate 10 is thinned by, for example, grinding from the second surface 102. In one or more embodiments, a second mask layer 64, for example, a PR layer, is formed over the second surface 102 of the substrate 10. The second mask layer 64 exposes a portion of the second surface 102.

Figure 7D:
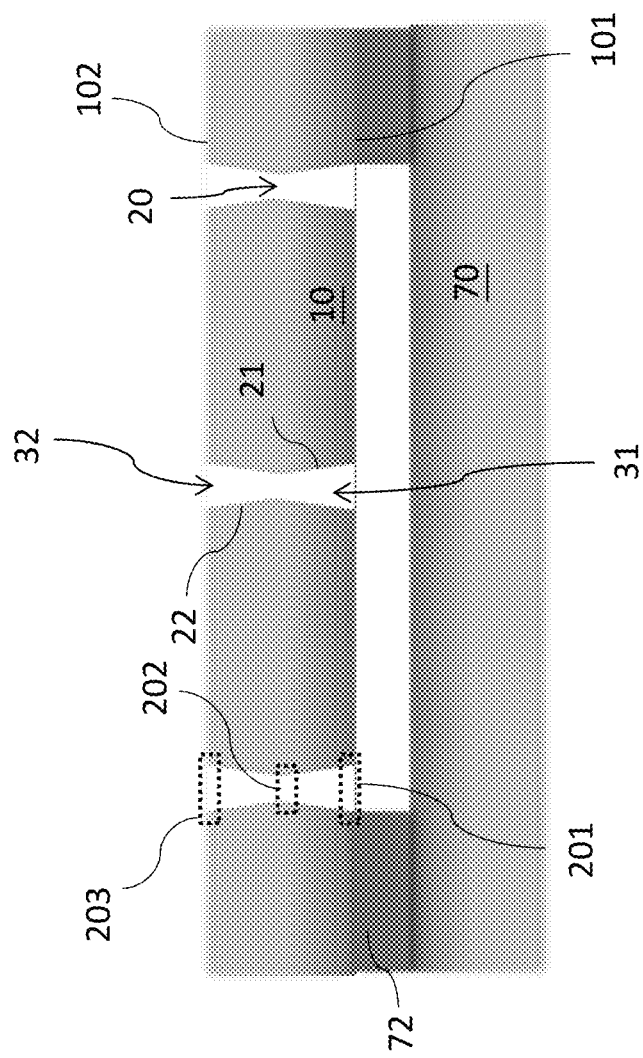

Referring to FIG. 7D, a plurality of second recesses 32 are formed from the second surface 102 of the substrate 10. In one or more embodiments, each of the second recesses 32 includes the second tapered inner surface 22. The second recess 32 includes a third aperture 203 exposed from the second surface 102, and the third aperture 203 is larger than the second aperture 202. The second recesses 32 are in communication with the first recesses 31, respectively, thereby forming a plurality of channels 20 through the substrate 10. In one or more embodiments, the second recesses 32 are formed by etching, such as by anisotropic etching, such that second recess 32 includes the second tapered inner surface 22 with lower surface roughness. By way of example, the anisotropic etching includes, but is not limited to, dry etching. In one or more embodiments, the surface roughness of the second tapered inner surface 22 is, but not limited to, less than about 20 nm. Subsequently, the second mask layer 64 is removed from the second surface 102 of the substrate 10.

Figure 7E:
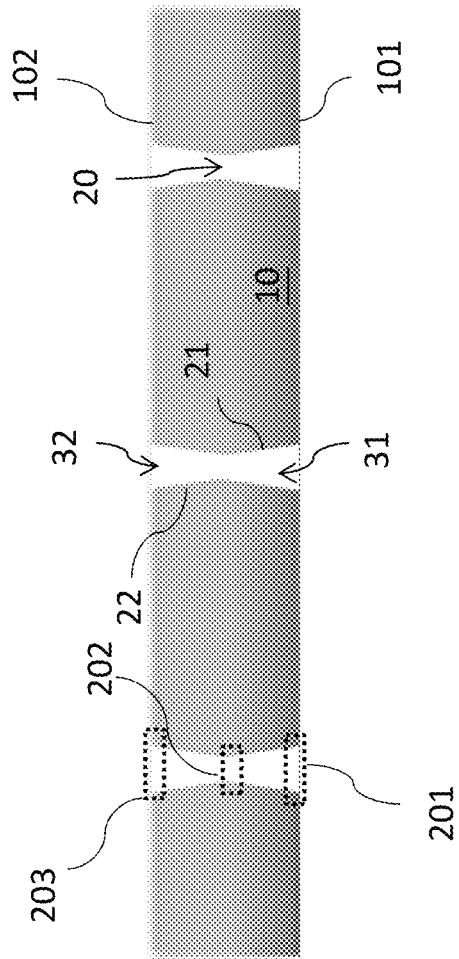

Referring to FIG. 7E, the carrier 70 is removed from the substrate 10 to form the collimator 1.

The collimator of the present disclosure includes a through channel having a tapered inner surface and a minimum or narrowest aperture of the channel distal to or spaced from two openings of the channel. The channel with a tapered inner surface is able to provide a better collimation with lower AR, and may be relatively easier to fabricate.

As used herein, the singular terms "a," "an," and "the" may include plural referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. As another example, "substantially perpendicular" may refer to a range of angular variation about 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A collimator, comprising:
   a substrate comprising a first surface, a second surface opposite the first surface, and a third surface between the first surface and the second surface,
   wherein the substrate defines a plurality of channels through the substrate, each of the channels comprising a first aperture exposed from the first surface, and a second aperture between the first surface and the second surface and exposed from the third surface, the second aperture being smaller than the first aperture, wherein the second aperture is a smallest aperture of each channel,
   wherein the substrate further defines a third aperture exposed from the second surface, and the third aperture is connected to and in communication with the second aperture of each of the plurality of channels,
   wherein, for each channel, the substrate comprises a first tapered inner surface between the first aperture and the second aperture, and the first tapered inner surface comprises a first tapered angle, and
   wherein the first tapered angle is determined by an equation:

$$\tan\theta_{T1} = \frac{N}{2(N-2)H}\left[\frac{D(N-2)}{2N} - 2H\sin\theta\right]$$

and wherein:
$\theta_{T1}$ is the first tapered angle;
N is a scattering level having a given value;
H is a distance between the first aperture and the second aperture;
D is a diameter of the first aperture; and
$\theta$ is an acceptance angle of a light beam entering each channel.

2. The collimator according to claim 1, wherein a surface roughness of the first tapered inner surface is less than about 20 nanometers.

3. The collimator according to claim 1, wherein the distance H between the first aperture and the second aperture is about half of a depth of each channel.

4. The collimator according to claim 3, wherein, for each channel, the substrate further comprises a second tapered inner surface between the second aperture and the third aperture, and the second tapered inner surface comprises a second tapered angle substantially equal to the first tapered angle.

5. The collimator according to claim 1, wherein each channel further comprises a fourth aperture adjacent to the second aperture, the fourth aperture being larger than the second aperture and smaller than the third aperture.

6. An optical device, comprising:
   a collimator, comprising:
   a substrate comprising a first surface and a second surface opposite the first surface, the substrate defining a plurality of channels through the substrate, each of the channels comprising a first aperture exposed from the first surface, a second aperture between the first surface and the second surface, and a third aperture exposed from the second surface, wherein the second aperture is a smallest aperture of each channel, the substrate comprises, for each channel, a first tapered inner surface between the first aperture and the second aperture, and the first tapered inner surface comprises a first tapered angle; and
   an optoelectronic element disposed over the collimator, wherein the optoelectronic element includes a plurality of electromagnetic radiation-emitting units, and each of the electromagnetic radiation-emitting units corresponds to and is aligned with one or more of the channels,
   wherein the first tapered angle is derived from an equation:

$$\tan\theta_{T1} = \frac{N}{2(N-2)H}\left[\frac{D(N-2)}{2N} - 2H\sin\theta\right]$$

and wherein:
$\theta_{T1}$ is the first tapered angle;
N is a scattering level having a given value;

H is a distance between the first aperture and the second aperture;

D is a diameter of the first aperture; and

θ is an acceptance angle of a light beam entering each channel.

7. The optical device according to claim 6, wherein each channel further comprises a fourth aperture adjacent to the second aperture, and, for each channel, the substrate further comprises a second tapered inner surface between the third aperture and the fourth aperture, and the second tapered inner surface is disconnected from the first tapered inner surface.

8. The optical device according to claim 6, wherein, for each channel, the substrate further comprises a second tapered inner surface between the second aperture and the third aperture, and the second tapered inner surface is connected to the first tapered inner surface.

\* \* \* \* \*